July 20, 1954
R. ENZMANN ET AL
2,684,093
PROCESS AND APPARATUS FOR INCREASING SOUND ABSORBING
PROPERTIES OF ACOUSTICAL MATERIAL
Filed June 7, 1952
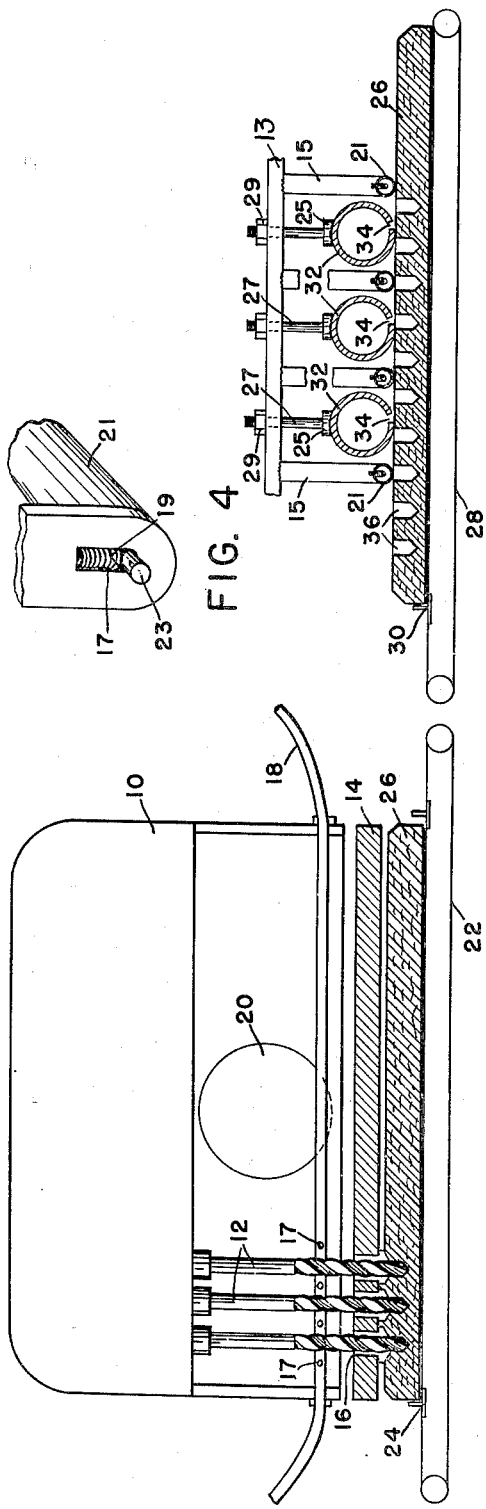
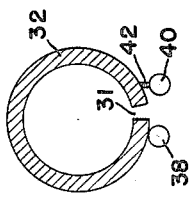
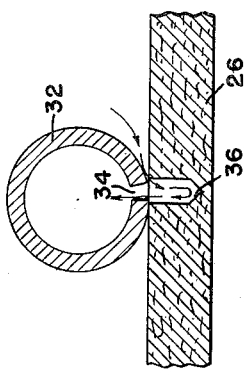
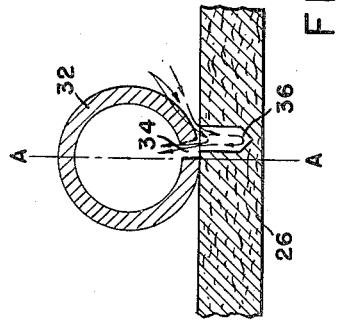
INVENTORS.
EDGAR A. LAURING
RALPH ENZMANN
WILBERT J. E. KIRK
BY
H. F. Woodward
atty.

Patented July 20, 1954

2,684,093

UNITED STATES PATENT OFFICE 2,684,093

PROCESS AND APPARATUS FOR INCREASING SOUND ABSORBING PROPERTIES OF ACOUSTICAL MATERIAL

Ralph Enzmann, Edgar A. Lauring, and Wilbert J. E. Kirk, International Falls, Minn., assignors to Minnesota and Ontario Paper Company, Minneapolis, Minn.

Application June 7, 1952, Serial No. 292,338

2 Claims. (Cl. 144—309)

This invention pertains to betterments in a method and apparatus for drilling perforations in acoustical material requiring a large number of openings within a relatively small area.

Fiber composition boards are used as acoustical correction material and in many instances the acoustical value of such boards may be enhanced by providing the board with independent artificial openings extending inwardly from the surface.

Heretofore when fiber composition boards have been perforated, considerable difficulty has been encountered in properly cleaning the artificial openings.

The present invention is capable of numerous forms and variations without departing from the essential features herein disclosed. It is therefore intended and desired that the embodiment shown herein be deemed illustrative and not restrictive and that the patent shall cover all features of patentable novelty existing in the invention disclosed, reference being had to the claims rather than to the specific description herein to indicate the scope of the invention.

In the drawing forming a part of this application, similar characters of reference indicate corresponding parts in all the views.

Figure 1 is an acoustical drilling head, partially in section, with only a part of the drills in place and the combination of the hole cleaning apparatus;

Figure 2 is an end view of the hole cleaning apparatus, partially in section;

Figure 3 is end view of a modified form of the hole cleaning apparatus; and

Figure 4 is view of a board holddown roll and support therefor with parts broken away.

Multiple spindle drilling apparatus of various types may be employed and the type shown in U. S. Patent 2,342,251 of 1944 may be utilized but regardless of the drilling apparatus used, hole cleaning must be performed.

In the drawing, 10 indicates a drill head in which are shown drills 12 in place, most of the drills not being shown. Extending through the drill head is air pipe 18, which is provided with a series of openings 17 positioned around the drills 12. Positioned below drill head 10 is drill plate 14, which is provided with bushing 16. Suction is provided for the drill head and is connected at 20. The purpose of this suction will be hereinafter more fully described. A fiberboard to be drilled is conveyed to the drilling position on conveyor 22, which is provided with lugs 24. The conveyor 22 operates intermittently with the drill head. When the drill head is in nondrilling position, the board is moved in place and during the drilling operation the conveyor is inactive. After the board 26 is drilled, conveyor 22 moves the board so that it may be picked up by conveyor 28, which is provided with lugs 30. The board 26 with openings 36 therein passes under vacuum hole-cleaning means 32, which are provided with openings 34. If the board 26 has a very delicate coating which might be damaged by rubbing against the vacuum cleaning pipes 32, then a suitable board holddown unit as indicated generally at 11 in Figure 1 may be used. The holddown unit includes spaced horizontal frame members 13 and members 15 extending downwardly from the horizontal members. The free ends of members 15 are provided with openings 17 through which shaft 19 of rolls 21 extends. So that caliper variations may be compensated for the rolls 21 may move in the openings 17. The rolls are normally urged downwardly under the influence of spring means 19 which are mounted in the openings 17. The vacuum means 32 may be adjusted so that they are out of contact with the board surface. Attached to each vacuum pipe is member 25 which is operatively connected to screw threaded members 27. The members 27 are supported by the horizontal members 13 and movements of the member 32 are controlled by nutlike members 29.

In Figure 2 is shown two arrangements of the vacuum cleaning means 32. In the left-hand view the opening 34 is advanced beyond the center line A—A of the vacuum cleaning means 32. The purpose of this arrangement will be hereinafter more fully described.

In Figure 2 the right-hand view shows a less desirable position of the vacuum cleaning means.

Figure 3 is a modified view of the vacuum cleaning means in which there is in position and attached to the vacuum cleaning means a series of rollers, or similar devices, 38. If this arrangement is used the holddown unit indicated generally at 11 is not employed.

The suction at the drill head 10 does not function to clean out the holes 36 in the fiberboard. The purpose of the suction in the drill head is to carry out the drillings and keep the drills functioning properly at all times. Compressed air is furnished to the drill head through conduit 18 and is discharged around the drills to knock out the drillings carried by the drill and also to keep the drillings stirred up and prevent them from depositing on the drill plate and bushings therein. The compressed air also functions as a source of air for the vacuum cleaning means. The drills 12 are not pulled out of the guide plate 14 during the drilling and the suction or vacuum used is fairly low and will not clean out the flutes of the drills which are in fact in the drill plate when in nondrilling position. If high vacuum was supplied to the drill head, the drills would not be completely cleaned and use of such high vacuum would cause other difficulties such as the suction of oil in the drill head through its bearings. Thus it is necessary to use fairly low vacuum in the drill head and supply compressed air for cleaning the drills.

Regardless of the operation during the drilling, the holes 36 must be cleaned after they are formed. The vacuum cleaning of the holes consists of one or more conduits having slots being cut longitudinally thereof. A series of holes or small slots may be used in lieu of longitudinal slots but the best results have been obtained by using longitudinal slots. In some operations, the board 26 slides against the vacuum cleaning means 32 but for delicate type coatings on the drilled board, rolls, such as shown in Figures 1 and 3, become necessary to support the board and prevent damaging to the coatings by the vacuum pipes 32.

As indicated, a slot is preferred over holes since no exact lining up is required with the use of slots. The size of the slots or holes may be varied over a fairly large range. However, to obtain the best results, the width of the slot should be 2/3 of the diameter of the hole 36. A slot of this size does not plug and allows substantially 100 per cent of the loose fibers to pass therethrough. For the best results, the slots or holes should be adjusted so that there is a slight opening with respect to the tile as shown in the left-hand view of Figure 2. The vacuum pipes 32 are positioned above and transversely of the conveyor 28 for removing the drillings from the drilled holes in the board 26. The openings 34 are located laterally of the vertical axis A—A so that openings are provided between the board and the suction pipes as the board passes beneath said pipes.

It is to be understood that the opening may be either on the leading or departing side as the tile moves by. From the work done so far, the arrangement on which the hole is on the departing side causes less damage to the tile and better cleaning is obtained. In addition to this, the slight opening between the vacuum cleaning means 32 and board 26 permits air to be drawn down into the opening 36 and carries out substantially all of the loose fibers.

We claim:

1. A device of the class described including a conveyor for advancing drilled acoustical tile, vacuum suction pipes positioned above and transversely of the conveyor for removing drillings in the drilled opening, said pipes having slots therein of a width of about two-thirds the width of the drilled openings and said slots located laterally of the vertical axis of the pipes so that an opening is provided between the drilled tile and the slots in the piping whereby air is drawn into the drilled openings for removal of the drillings.

2. A process of improving the acoustical properties of vegetable fiber board comprising forming independent artificial openings extending inwardly from the surface of the fiber board, advancing the fiber board and removing substantially all of the fibers loosened by forming the openings by drawing air into the artificial openings by means of spaced-apart suction pipes having slots therein of about two-thirds the width of the artificial openings in the surface of the board, said slots located laterally of the vertical axis of the pipes so that openings are provided between the board and the suction pipes as the board passes beneath the said pipes.

References Cited in the file of this patent

UNITED STATES PATENTS

| Number | Name | Date |
| --- | --- | --- |
| 751,253 | Brady | Feb. 2, 1904 |
| 994,430 | Tunks | June 6, 1911 |
| 1,471,246 | Daniels | Oct. 16, 1923 |
| 1,982,713 | Welch | Dec. 4, 1934 |
| 2,142,711 | Birch | Jan. 3, 1939 |
| 2,234,789 | Wunderlich | Mar. 11, 1941 |
| 2,434,750 | Trecker | Jan. 20, 1948 |